US012377758B2

(12) United States Patent
Song

(10) Patent No.: US 12,377,758 B2
(45) Date of Patent: Aug. 5, 2025

(54) ADAPTIVE SEAT COMFORT SYSTEM BASED ON PASSENGER-SEAT FIT DEGREE, AND ADJUSTMENT METHOD

(71) Applicant: Alfmeier Automotive Systems (Shanghai) Co., Ltd., Shanghai (CN)

(72) Inventor: Hongyu Song, Shanghai (CN)

(73) Assignee: Alfmeier Automotive Systems (Shanghai) Co. Ltd., Shanghai (CN)

( * ) Notice: Subject to any disclaimer, the term of this patent is extended or adjusted under 35 U.S.C. 154(b) by 38 days.

(21) Appl. No.: 18/041,953

(22) PCT Filed: Jul. 23, 2021

(86) PCT No.: PCT/CN2021/108038
§ 371 (c)(1),
(2) Date: Feb. 16, 2023

(87) PCT Pub. No.: WO2022/037357
PCT Pub. Date: Feb. 24, 2022

(65) Prior Publication Data
US 2023/0311717 A1    Oct. 5, 2023

(30) Foreign Application Priority Data
Aug. 20, 2020  (CN) .......................... 202010841033.4

(51) Int. Cl.
*B60N 2/02* (2006.01)
*B60N 2/00* (2006.01)
*B60N 2/90* (2018.01)

(52) U.S. Cl.
CPC .......... *B60N 2/0244* (2013.01); *B60N 2/002* (2013.01); *B60N 2/914* (2018.02); *B60N 2/0268* (2023.08)

(58) Field of Classification Search
CPC .......... A47C 7/46; B60N 2/914; B60N 2/002; B60N 2/0268; B60N 2/0244
(Continued)

(56) References Cited

U.S. PATENT DOCUMENTS

| 5,170,364 A | 12/1992 | Gross et al. |
|---|---|---|
| 6,088,642 A | 7/2000 | Finkelstein et al. |

(Continued)

FOREIGN PATENT DOCUMENTS

| CN | 101734175 | 6/2010 |
|---|---|---|
| CN | 104627031 | 5/2015 |

(Continued)

OTHER PUBLICATIONS

International Search Report in International Application No. PCT/CN2021/108038, dated Oct. 29, 2021, 7 pages, with English Translation.

(Continued)

*Primary Examiner* — Jose V Chen
(74) *Attorney, Agent, or Firm* — Fish & Richardson P.C.

(57) ABSTRACT

The present disclosure describes a self-adaptive seat comfort system based on a fitness of occupant and seat and includes an ECU control system. The ECU control system is provided with a communication module, a microcontroller, a power supply module, a seat-occupant fitness detection module, and a comfort adjustment module. The seat-occupant fitness detection module and the comfort adjustment module are connected bidirectionally with the microcontroller through wires, and the microcontroller module is connected bidirectionally with the communication module through wires. The present disclosure further describes a self-adaptive seat comfort system and an adjustment method based on the fitness of occupant and seat, which can further realize intelligent dynamic adjustment, and adjust the supporting (Continued)

positions for various parts dynamically according to the degree of fitness of occupant and seat detected by the sensing circuit provided on the seat comfort system.

19 Claims, 3 Drawing Sheets

(58) Field of Classification Search
USPC .................................................. 297/284.1
See application file for complete search history.

(56) References Cited

U.S. PATENT DOCUMENTS

| | | | | |
|---|---|---|---|---|
| 10,214,118 | B1* | 2/2019 | Jain | B60K 35/10 |
| 11,617,451 | B1* | 4/2023 | Caruso | A47C 7/462 |
| | | | | 297/217.3 |
| 2010/0289302 | A1* | 11/2010 | Cheng | B60N 2/002 |
| | | | | 700/282 |
| 2012/0086249 | A1* | 4/2012 | Hotary | B60N 2/501 |
| | | | | 297/284.3 |
| 2015/0008710 | A1* | 1/2015 | Young | B60N 2/0023 |
| | | | | 297/217.3 |
| 2017/0158088 | A1 | 6/2017 | Pike et al. | |
| 2017/0190271 | A1* | 7/2017 | Patrick | B60N 2/0244 |
| 2017/0259698 | A1* | 9/2017 | Cuddihy | B60N 2/914 |
| 2017/0349061 | A1* | 12/2017 | Benson | B60N 2/2222 |
| 2017/0361746 | A1* | 12/2017 | Zouzal | B60K 26/02 |
| 2018/0170230 | A1* | 6/2018 | Onuma | B60N 2/70 |
| 2018/0177675 | A1* | 6/2018 | Osgood | B60N 2/665 |
| 2018/0229638 | A1* | 8/2018 | Minato | B60N 2/22 |
| 2019/0193591 | A1 | 6/2019 | Migneco et al. | |
| 2021/0016686 | A1* | 1/2021 | Yetukuri | B60N 2/0022 |
| 2021/0170926 | A1* | 6/2021 | Migneco | B60N 2/5685 |
| 2021/0232642 | A1* | 7/2021 | Ricci | G08G 1/0968 |
| 2021/0402902 | A1* | 12/2021 | Dörfler | B60R 16/037 |
| 2023/0127818 | A1* | 4/2023 | Jayaraman | A61G 7/05769 |
| | | | | 5/614 |
| 2024/0227714 | A1* | 7/2024 | Shirur | B60R 21/01508 |

FOREIGN PATENT DOCUMENTS

| | | |
|---|---|---|
| CN | 206664359 | 11/2017 |
| CN | 107599919 | 1/2018 |
| CN | 108237953 | 7/2018 |
| CN | 207657658 | 7/2018 |
| CN | 109606210 | 4/2019 |
| CN | 112092686 | 12/2020 |
| JP | 2009119230 | 6/2009 |
| JP | 2012032342 | 2/2012 |
| KR | 10-2020-0034106 | 3/2020 |

OTHER PUBLICATIONS

Office Action in Japanese Application No. 2023-512422, dated Apr. 24, 2024, 10 pages (with Machine Translation).

Search Report in Chinese Application No. 202010841033, dated Aug. 15, 2023, 1 page.

Extended European Search Report in European Application No. 21857452.3, mailed on Nov. 19, 2024, 10 pages.

Office Action in Korean Application No. 10-2023-7009519, dated Sep. 30, 2024, 11 pages (with Machine Translation).

* cited by examiner

ADAPTIVE SEAT COMFORT SYSTEM BASED ON PASSENGER-SEAT FIT DEGREE, AND ADJUSTMENT METHOD

TECHNICAL FIELD

The invention relates to the technical field of automotive seat system, in particular to a self-adaptive seat comfort system and an adjustment method based on a fitness of occupant and seat.

BACKGROUND OF THE INVENTION

At present, the comfort of automobile becomes more and more important, and the automotive seating system affects the ride comfort to a great extent. The control of seat comfort system of the traditional automobile is mainly achieved by buttons and vehicular communication to adjust the position of each supporting airbag of the seat. On one hand, the sitting posture and body shape of each occupant are different, which causes that the occupant has to adjust the position of each supporting airbag manually all the time, resulting in poor user experience. On the other hand, manual adjustment limits the number of airbags, so that the maximum possible fitness of the seat and the human body cannot be achieved, reducing the comfort and support of the seat.

BRIEF DESCRIPTION OF THE INVENTION

The present invention provides a self-adaptive seat comfort system and an adjustment method based on a fitness of occupant and seat to overcome the shortcomings in the prior art, which can further realize intelligent dynamic adjustment, and adjust the supporting positions for various parts dynamically according to the degree of fitness of occupant and seat detected by the sensing circuit provided on the seat comfort system.

To achieve the above objectives, a self-adaptive seat comfort system based on a fitness of occupant and seat is designed, comprising an ECU control system, wherein the ECU control system is provided with a communication module, a microcontroller, a power supply module, a seat-occupant fitness detection module and a comfort adjustment module, where the seat-occupant fitness detection module and the comfort adjustment module are connected bidirectionally with the microcontroller through wires, and the microcontroller module is connected bidirectionally with the communication module through wires.

The power supply module is connected with the communication module, the microcontroller, the seat-occupant fitness detection module and the comfort adjustment module through wires.

The seat-occupant fitness detection module and the comfort adjustment module comprise an gas valve driving module, a capacitive sensing module, an air pressure and temperature sensing module and an gas pump driving module, where the capacitive sensing module is connected bidirectionally with the microcontroller through wires, an output end of the microcontroller is connected with the gas valve driving module and the gas pump driving module respectively, the gas valve driving module is connected with the airbags through an actuator of a control valve, and the gas pump driving module is connected with an gas pump through wires.

The gas valve driving module comprises but is not limited to a solenoid valve or a memory alloy wire.

The airbag is provided inside the car seat, and at least one airbag is provided, a bottom of the airbag is connected with felt, and a plurality of resistance wire as a sensor are distributed on a surface of each airbag, the resistance wire as a sensor are connected with a capacitive sensing circuit.

A specific workflow of the system is as follows:
(1) start;
(2) initialization of hardware;
(3) initialization of system variables;
(4) the system detects whether the current capacitance values on all airbags are within a calibration range, if so, the system ends, otherwise, detects the capacitance values on the airbags in turn periodically;
(5) detect the capacitance value of a gas bag and determine whether the capacitance value is greater than a first threshold value, if so, go to step (6), otherwise, go to step (8);
(6) open the control valve for inflation of the airbag;
(7) the control valve starts the working of the gas pump;
(8) determine whether the capacitance value is greater than the second threshold value 2, if so, go to step (9), otherwise, go to step (11);
(9) close the control valve for inflation of the airbag;
(10) the control valve stops the working of the gas pump;
(11) determine whether the capacitance value is less than the third threshold value, if so, go to step (12), otherwise, detect the capacitance value on the next airbag;
(12) open the control valve for deflation of the airbag;
(13) the control valve starts the working of the gas pump;
(14) detect the capacitance value on the next airbag, and repeat step (4).

The first threshold value is the value for determining whether to start inflating or not; the second threshold value is the value for determining whether to stop inflating or not; the third threshold value is the value for determining whether to start deflating or not; the third threshold value is less than the first threshold value, and the first threshold value is less than the second threshold value.

The system variables comprise a sign of system calibration completed, a sign of system initialization detection completed and a sign of major algorithm data detection completed.

The specific method for capacitance detection is with the formula $$C = \frac{\varepsilon A}{d},$$

where C is the capacitance value, d is the distance between the occupant and the resistance wire as a sensor, A is the contact area of the resistance wire as a sensor, $\varepsilon$ is dielectric constant.

Compared with the prior art, the present invention provides the self-adaptive seat comfort system and the adjustment method based on the fitness of occupant and seat, which can further realize intelligent dynamic adjustment, and adjust the supporting positions for various parts dynamically according to the degree of fitness of occupant and seat detected by the capacitance sensor provided on the seat comfort system.

DETAILED DESCRIPTION OF THE INVENTION

The invention will be further described with reference to the appended drawings.

Figure 2:
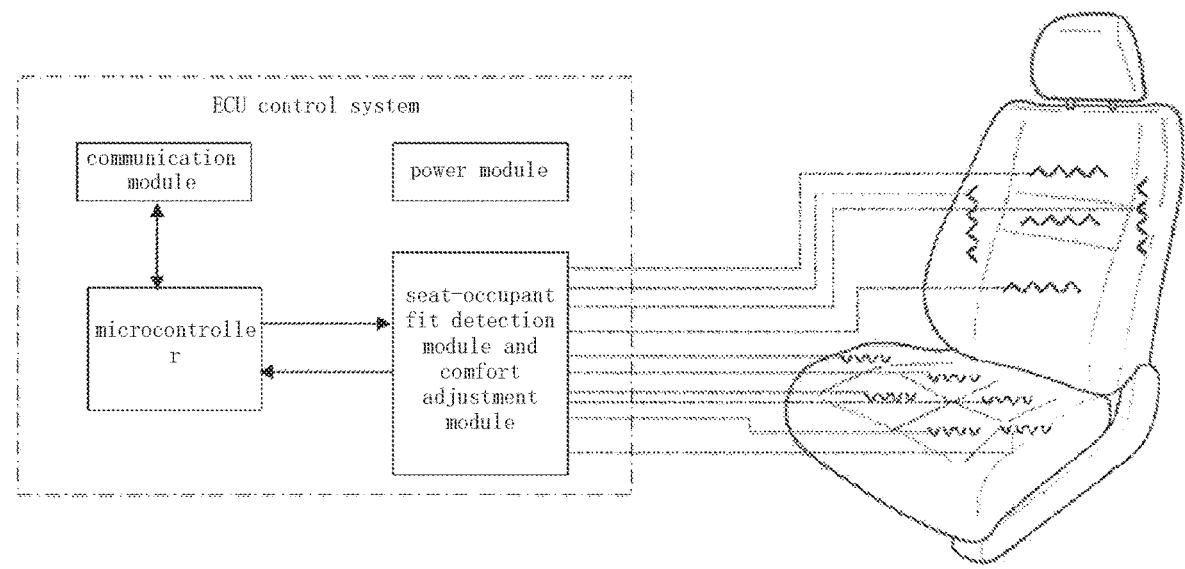

As shown in FIG. 2, an ECU control system is provided with a communication module, a microcontroller, a power supply module, a seat-occupant fitness detection module and a comfort adjustment module. The seat-occupant fitness detection module and the comfort adjustment module are connected bidirectionally with the microcontroller through wires, and the microcontroller module is connected bidirectionally with the communication module through wires.

The power supply module is connected with the communication module, the microcontroller, the seat-occupant fitness detection module and the comfort adjustment module through wires.

Figure 1:
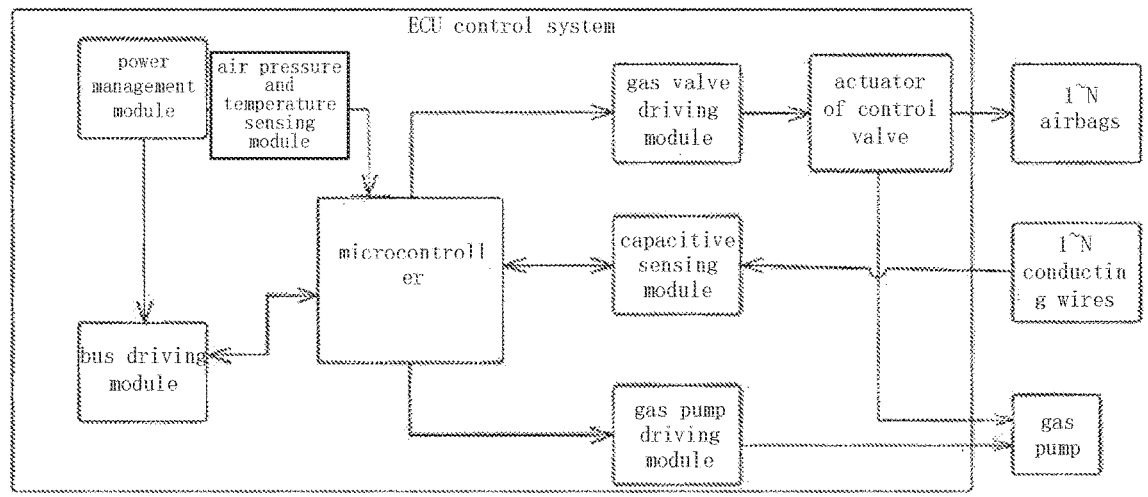
FIG. 1 and FIG. 2 are connection diagrams of the system framework according to the present invention.

As shown in FIG. 1, the seat-occupant fitness detection module and the comfort adjustment module comprise an gas valve driving module, a capacitive sensing module, an air pressure and temperature sensing module: a gas pump driving module. The capacitive sensing module is connected bidirectionally with the microcontroller through wires, an output end of the microcontroller is connected with the gas valve driving module and the gas pump driving module respectively, the gas valve driving module is connected with the airbags through a actuator of control valve, and the gas pump driving module is connected with a gas pump through wires.

The gas valve driving module comprises but is not limited to a solenoid valve or a memory alloy wire.

Figure 3:
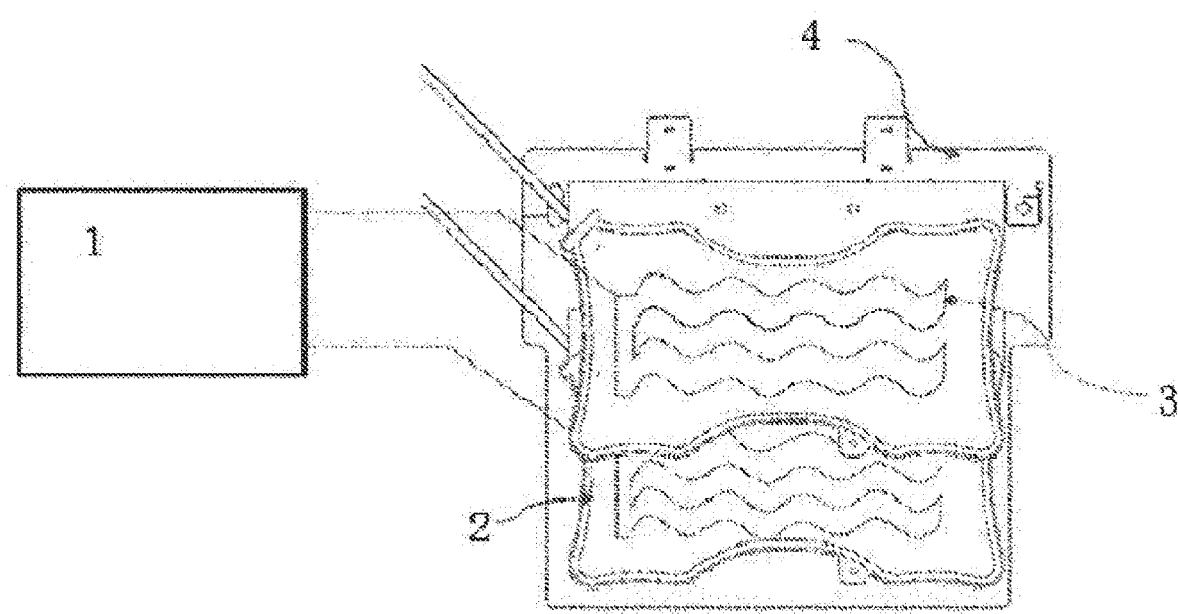
FIG. 3 is a schematic diagram of the connection structure between the airbags and the resistance wires as a sensor.

As shown in FIG. 3, the airbag is provided inside the car seat, and at least one airbag 2 is provided. The number of airbags 2 can be defined by customers. A bottom of the airbag 2 is connected with felt 4, and a plurality of resistance wire as a sensor 3 are distributed on a surface of each airbag 2, the resistance wire as a sensor 3 are connected with a capacitive sensing circuit 1. The capacitive sensing circuit is a conventional circuit, where a main controller MCU can read a multi-channel capacitance value of the capacitive sensing circuit by means of IIC, SPI bus or AD mode, and the capacitive sensing circuit can be completed by using a conventional multi-channel high-speed capacitance to digital converter chip, an application specific integrated circuit or analog circuit.

Figure 4:
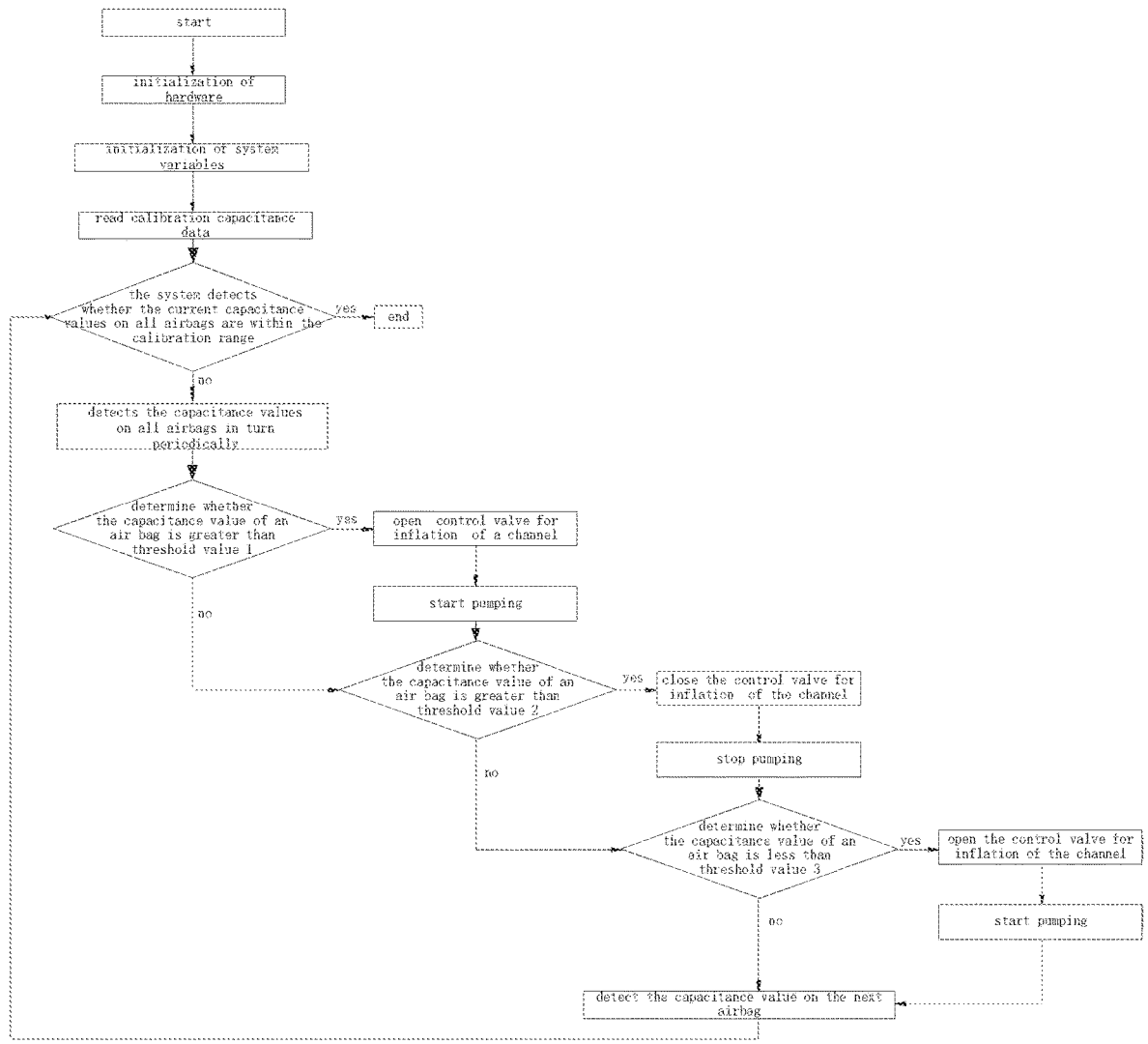
FIG. 4 is a flow chart of the software according to the present invention.

As shown in FIG. 4, a specific workflow of the system according to the present invention is as follows:
(1) start;
(2) initialization of hardware;
(3) initialization of system variables;
(4) the system detects whether the current capacitance values on all airbags are within a calibration range, if so, the detecting ends, otherwise, detects the capacitance values on the airbags in turn periodically;
(5) detect the capacitance value of an airbag and determine whether the capacitance value is greater than a first threshold value, if so, go to step (6), otherwise, go to step (8);
(6) open the control valve for inflation of the airbag;
(7) the control valve starts the working of the gas pump;
(8) determine whether the capacitance value is greater than the second threshold value, if so, go to step (9) otherwise, go to step (11);
(9) close the control valve for inflation of the airbag;
(10) the control valve stops the working of the gas pump;
(11) determine whether the capacitance value is less than the third threshold value, if so, go to step (12), otherwise, detect the capacitance value on the next airbag;
(12) open the control valve for deflation of the airbag;
(13) the control valve starts the working of the gas pump;
(14) detect the capacitance value on the next airbag, and repeat step (4).

The first threshold value is the value for determining whether to start inflating or not: the second threshold value is the value for determining whether to stop inflating or not: the third threshold value is the value for determining whether to start deflating or not: the third threshold value is less than the first threshold value, and the first threshold value is less than the second threshold value.

The system variables comprise a sign of system calibration completed, a sign of system initialization detection completed and a sign of major algorithm data detection completed. A specific method for capacitance detection is with the formula $$C = \frac{\varepsilon A}{d},$$

where C is the capacitance value, d is the distance between the occupant and the resistance wires as a sensor, A is the contact area of the resistance wire as a sensor, which is exemplarily illustrated as an area occupied by shape of the resistance wires as shown in FIG. 3, $\varepsilon$ is dielectric constant.

The capacitance sensor used in the present invention is not a capacitance sensor in the traditional sense, instead, the resistance wires arranged in a customized shape are used to realize the function of a sensor. This method has the characteristics of low cost, high customization, long service life and strong anti-interference ability.

The capacitance sensor is a technology that the inflation and deflation of each airbag is controlled by measuring the change in the capacitance value of the sensing circuit made by an occupant. Compared with the traditional manual adjustment of each airbag, the self-adaptive seat comfort system has a dynamic adjustment comfort system, improving the personalization of occupant comfort.

The function of airbag inflation and deflation of the seat comfort system would affect the distance between the occupant and the resistance wire as a sensor on the airbag and the contact area, resulting in the change in the capacitance value. The seat-occupant fitness detection module and the comfort adjustment module of the present invention determines that each airbag needs to be adjusted by the algorithm, according to the change in the capacitance values of different channels, the seat comfort system adjusts the position for supporting of each airbag in the system for various parts of a human body, according to information given by the seat-occupant fitness detection module, satisfying the requirement of comfort and personalization of different occupants, and performing self-adaptive adjustment according to the thickness of clothes worn by the occupants, without setting special parameter, so as to offer the same level of comfort to the occupants under different seasonal temperature conditions.

A vehicle mounted microcontroller, MCU chip, is applied in the present invention, which is connected with a vehicle bus by a one-board bus. The physical interfaces of a CAN bus and a LIN line bus are integrated in hardware for self-adaption of bus communication protocols of different manufacturers.

A LDO power supply system is applied in the power supply module, the power consumption of which is managed by MCU. Power management is separated into a deep sleep mode and a light sleep mode, which can reduce the static power consumption of the terminal greatly and pass the certification of low power consumption of automobiles completely.

A proprietary capacitive gathering module is applied in the capacitive sensing module, and the capacitance value of the conducting wire as a capacitance is read by means of the bus. Compared with the capacitance value of an empty seat, the change of the occupant's position can be obtained by elimination of data redundancy and jitter, further driving the control valve of the seat comfort system to control the opening and closing of the valve in a very accurate way, thereby adjusting the position of each airbag in the system for supporting various parts of the human body, satisfying the requirement of comfort and personalization of different occupants. Meanwhile, the circuit is provided with short circuit and open circuit detection functions for system reliability

The invention claimed is:

1. A seat-occupant fitness detection module, comprising:
a capacitive sensing module comprising:
a capacitance sensor, and
a capacitive sensing circuit, wherein
the capacitance sensor is connected with the capacitive sensing circuit,
the capacitance sensor is configured to be disposed on a surface of an airbag, so that a capacitance value of the capacitance sensor changes with inflation or deflation of the airbag, and
the capacitance sensor comprises a resistance wire or a conducting wire, and a distance between an occupant and the resistance wire or the conducting wire changes with inflation or deflation of the airbag.

2. The seat-occupant fitness detection module as recited in claim 1, wherein the resistance wire or the conducting wire extends in a shape of a wave.

3. The seat-occupant fitness detection module as recited in claim 2, wherein the resistance wire or the conducting wire is arranged in a shape that occupies a contact area that changes with inflation or deflation of the airbag.

4. The seat-occupant fitness detection module as recited in claim 1, wherein the resistance wire or the conducting wire is arranged in a shape that occupies a contact area that changes with inflation or deflation of the airbag.

5. A seat comfort system, comprising:
a capacitive sensing module comprising a capacitance sensor and a capacitive sensing circuit, wherein the capacitance sensor is connected with the capacitive sensing circuit;
at least one airbag comprising a surface on which the capacitance sensor is disposed;
a gas pump configured to inflate the airbag;
a gas pump driving module configured to drive the gas pump;
a control valve configured to facilitate inflation or deflation of the airbag;
a gas valve driving module configured to drive the control valve;
a microcontroller connected with the capacitive sensing module, the gas pump driving module, and the gas valve driving module;
wherein a capacitance value of the capacitance sensor changes with inflation or deflation of the airbag, and a position for supporting the airbag is adjusted according to a change in the capacitance value, and
the capacitance sensor comprises a resistance wire or a conducting wire, and a distance between an occupant and the resistance wire or the conducting wire changes with inflation or deflation of the airbag.

6. The seat comfort system as recited in claim 5, comprising an air pressure and temperature sensing module connected with the microcontroller.

7. The seat comfort system as recited in claim 6, comprising:
a communication module connected with the microcontroller; and
a power supply module connected with the communication module, the microcontroller, the communication module, the capacitive sensing module, the gas pump driving module, and the gas valve driving module.

8. The seat comfort system as recited in claim 5, comprising a communication module connected with the microcontroller.

9. The seat comfort system as recited in claim 8, comprising a power supply module connected with the communication module, the microcontroller, the communication module, the capacitive sensing module, the gas pump driving module, and the gas valve driving module.

10. The seat comfort system as recited in claim 5, the at least one airbag comprises a plurality of airbags.

11. The seat comfort system as recited in claim 5, wherein the resistance wire or the conducting wire extends in a shape of a wave.

12. The seat comfort system as recited in claim 5, wherein the resistance wire or the conducting wire is arranged in a shape that occupies a contact area that changes with inflation or deflation of the airbag.

13. A method for adjusting a seat comfort system, comprising:
providing a capacitance sensor on an airbag in a seat so that a capacitance value of the capacitance sensor changes with inflation or deflation of the airbag, the capacitance sensor comprising a resistance wire or a conducting wire in which a distance between an occupant and the resistance wire or the conducting wire changes with inflation or deflation of the airbag;
obtaining the capacitance value of the capacitance sensor responsive to inflation or deflation of the airbag; and
comparing the capacitance value with a threshold value to determine whether to inflate, stop inflating, or deflate the air bag.

14. The method as recited in claim 13, wherein the threshold value is a first threshold value, and comparing the capacitance value with first threshold value to determine whether to inflate, stop inflating, or deflate the air bag comprises:
comparing the capacitance value with a second threshold value to determine whether to stop inflating the airbag; and
comparing the capacitance value with a third threshold value to determine whether to deflate the airbag;
wherein the third threshold value is less than the first threshold value, and the first threshold value is less than the second threshold value.

15. An ECU control system, comprising:
a communication module, a microcontroller, a power supply module, a seat-occupant fitness detection module, and a comfort adjustment module, wherein the seat-occupant fitness detection module and the comfort adjustment module are connected bidirectionally with the microcontroller through wires, and the microcontroller module is connected bidirectionally with the communication module through wires;

the power supply module is connected with the communication module, the microcontroller, the seat-occupant fitness detection module and the comfort adjustment module through wires;

the seat-occupant fitness detection module and the comfort adjustment module comprise a gas valve driving module, a capacitive sensing module, and a gas pump driving module, wherein:
the capacitive sensing module is connected bidirectionally with the microcontroller through wires, an output end of the microcontroller is connected with the gas valve driving module, and the gas pump driving module,
the gas valve driving module is connected with airbags through a controller of control valve, and
the gas pump driving module is connected with an gas pump through wires.

16. The ECU control system as recited in claim 15, wherein each of the airbags is provided inside a car seat, a bottom of the airbag is connected with felt, and a plurality of resistance wires that comprise a sensor are distributed on a surface of the at least one airbag, the resistance wires as a sensor are connected with a capacitive sensing circuit.

17. The ECU control system as recited in claim 15, wherein the system is configured to execute a workflow that comprises, in order, the steps of:
(1) start;
(2) initialization of hardware;
(3) initialization of system variables;
(4) the system detects whether current capacitance values on all airbags are within a calibration range, if so, the system ends, otherwise, detects the capacitance values on the airbags in turn periodically;
(5) detect the capacitance value of a gas bag and determine whether the capacitance value is greater than a first threshold value, if so, go to step (6), otherwise, go to step (8);
(6) open the control valve for inflation of the airbag;
(7) the control valve starts the working of the gas pump;
(8) determine whether the capacitance value is greater than a second threshold value, if so, go to step (9), otherwise, go to step (11);
(9) close the control valve for inflation of the airbag;
(10) the control valve stops the working of the gas pump;
(11) determine whether the capacitance value is less than a third threshold value, if so, go to step (12), otherwise, detect the capacitance value on the next airbag;
(12) open the control valve for deflation of the airbag;
(13) the control valve starts the working of the gas pump; and
(14) detect the capacitance value on the next airbag, and repeat step (4).

18. The ECU control system as recited in claim 17, wherein the first threshold value is the value for determining whether to start inflating or not; the second threshold value is the value for determining whether to stop inflating or not; the third threshold value is the value for determining whether to start deflating or not; the third threshold value is less than the first threshold value, and the first threshold value is less than the second threshold value.

19. The ECU control system as recited in claim 17, wherein the system variables comprise a sign of system calibration completed, a sign of a system initialization detection completed, and a sign of a major algorithm data detection completed.

* * * * *